Jan. 18, 1955     H. T. JENSEN     2,699,833
HELICOPTER AUTOMATIC TORQUE COMPENSATOR
Original Filed Oct. 5, 1946     2 Sheets-Sheet 1

H. T. JENSEN
INVENTOR

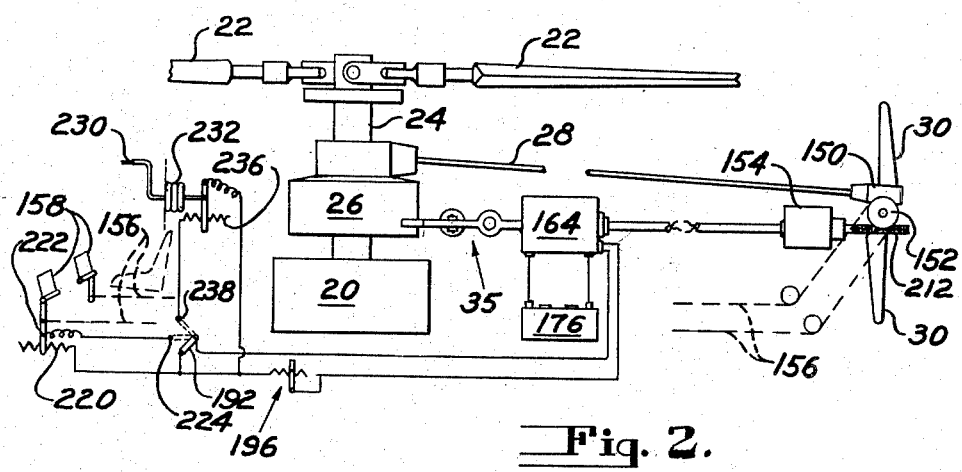
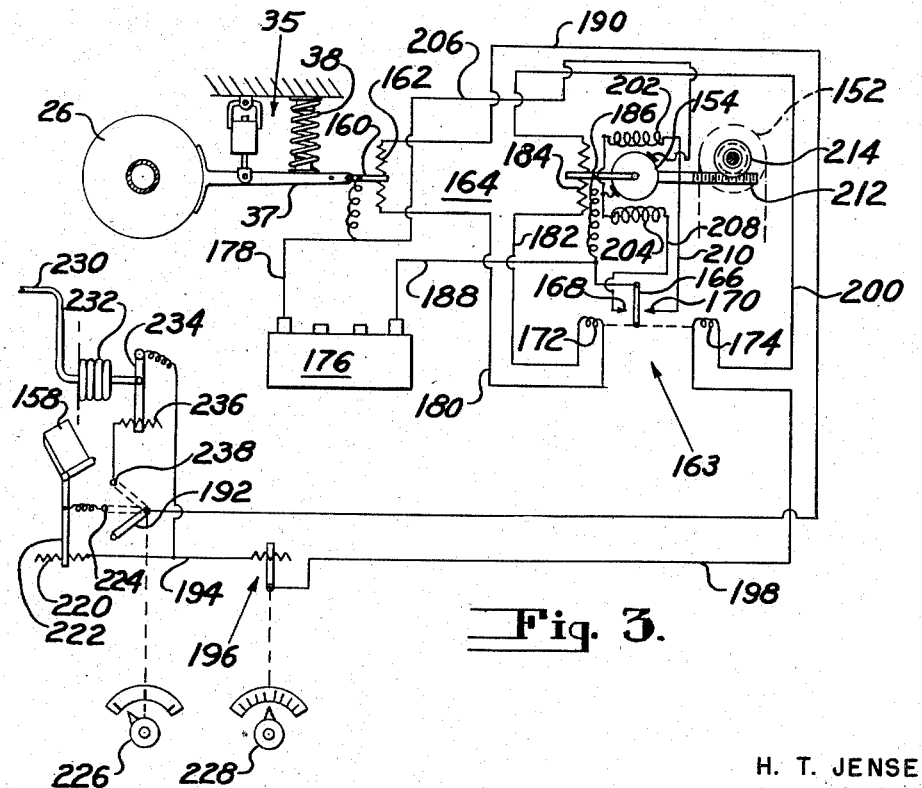

United States Patent Office 2,699,833
Patented Jan. 18, 1955

2,699,833
HELICOPTER AUTOMATIC TORQUE COMPENSATOR

Harry T. Jensen, Milford, Conn., assignor to United Aircraft Corporation, East Hartford, Conn., a corporation of Delaware Original application October 5, 1946, Serial No. 701,605, now Patent No. 2,644,534, dated July 7, 1953. Divided and this application June 3, 1953, Serial No. 359,374

7 Claims. (Cl. 170—135.22)

This application is a division of my copending application Serial No. 701,605, filed October 5, 1946, and assigned to the assignee of this application which issued July 7, 1953 as Patent No. 2,644,534.

This invention relates generally to rotary wing aircraft; more particularly to craft of the helicopter type; and more specifically to improved structure for compensating the torque of rotors of helicopters, to improve automatically operated structure for controlling the thrust of torque compensating rotors, and to improved means for obtaining and maintaining pitch trim in helicopters.

In presently known helicopters of the type employing an auxiliary rotor aft of the main rotor for compensating the torque of the latter, the pilot must attend constantly to the counterbalance of main rotor torque by adjusting the thrust of the torque compensating rotor, sometimes called the tail rotor. Such action on the part of the pilot may be done only by neglecting other controls at times, and may not be done accurately at all by an unskilled pilot thereby causing erratic operation of the helicopter and waste of fuel.

Heretofore, proposals have been made to provide gyroscopes, or the like, to maintain a given heading for a craft by actuation of a torque compensating rotor. Such devices, while probably satisfactory to a degree in forward flight, are nevertheless subject to a time delay action, or lag, because of the fact that an undesirable heading must be attained before any corrective force whatever is brought into play. When brought into play, the condition is usually worsening so that an excess of force must be used to overcome the condition and to return the helicopter to the desired heading, which action may cause hunting, and is quite likely to waste fuel.

Hence, an object of this invention is to provide improved automatic means for counteracting the torque of the sustaining rotor as substantially an instantaneous action or function responsive to torque of the sustaining rotor.

Another object is to provide an improved torque compensating device for helicopters, or the like.

A feature is to provide improved structure for obtaining automatic torque compensation while retaining a predetermined component of lift in the structure.

Still further objects and features reside in the mechanical and electrical details of construction and combinations of parts and will be either obvious or pointed out in the following specification and claims.

In the drawings,

Fig. 2 is a diagrammatic view of an electrical automatic torque compensation control system; and Fig. 3 is a wiring diagram of the structure shown in Fig. 2.

Figure 1:
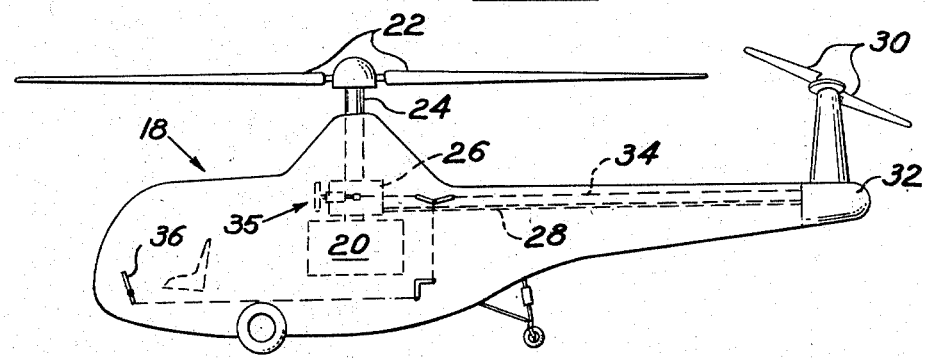
Fig. 1 is a side elevational view of a helicopter including my invention and showing parts thereof diagrammatically.

Referring more in detail to the drawings, and first to Fig. 1, a helicopter body 18 supports a suitable engine 20 for turning sustaining rotor blades 22 through a shaft 24. A reduction gear 26, which may be of the planetary gear type, is connected between the engine 20 and the shaft 24. A torque compensating rotor drive shaft 28 may also be driven by the engine 20 or through the reduction gearing 26 as best suits the installation, and the shaft 28 turns torque compensating rotor blades 30 shown as mounted upon a rotatable empennage or tail piece 32 carried at the rearmost extremity of the body 18.

Figs. 2 and 3 show an electrical device for performing substantially the same function as the mechanical device described in Patent No. 2,644,534 as regards automatic torque compensation of the main sustaining rotor by the action in response to main rotor torque of an automatic control mechanism acting upon the tail rotor. Referring first to Fig. 2, the engine 20 rotates the blades 22 through the drive shaft 24 and gearing contained in the housing 26. The tail rotor drive shaft 28 turns the tail rotor blades 30 through suitable gearing 150. The pitch of the blades 30 is changed by means of a worm and pulley 152 substantially in the same manner as shown in Patent No. 2,529,635, issued November 14, 1950, in Fig. 4, which shows a double worm device for changing the pitch of the sustaining rotor blades thereof. The same structure 152 may be used herein to respond either to a motor 154 operated in response to the torque of the main rotor in a manner to be described below, or operated through control cables 156 positioned by pedals 158 in the pilot's compartment of the helicopter. Movement of the pedals 158 will move the cables 156 differentially to rotate the pitch changing mechanism 152 to change the pitch of the blades and hence the thrust of the blades for a given speed of rotation thereof. The automatic control mechanism 35 may include a spring and damper of structure identical to that disclosed in Fig. 2 of Patent No. 2,644,534. An arm 37 and spring 38 are provided which connect the gear box 26 to the helicopter body 18. As the torque to drive shaft 24 changes, the gear box will tend to rotate in one direction or the other to change the tension of spring 38. The arm 37 may carry a potentiometer wiper 160 which moves over a potentiometer 162 to change the balance in a bridge circuit 164 in a manner now to be described.

The potentiometer 162 controls the action of a double relay 163 to move a contact arm 166 into engagement selectively with contacts 168 and 170. Relay coils 172 and 174 may be selectively energized by separate legs of the bridge circuit. A battery or generator 176 or the like supplies current to the relay coils 172 and 174 through the following circuits. Energy for the coil 172 may come from the battery 176 through a wire 178, the wiper 160, the lower half of potentiometer 162, wire 180, the coil 172, wire 182, the lower half of a potentiometer 184, a wiper 186 positioned by the motor 154 and wire 188 back to the other side of the battery 176. Current for the relay coil 174 is supplied from the battery 176 through the wire 178, wiper 160, the upper part of the potentiometer 162, wire 190, a three-way switch 192, wire 194, a trim adjusting potentiometer 196, wire 198, coil 174, wire 200, the upper portion of potentiometer 184, motor driven wiper 186, and wire 188 back to the battery 176. Energization of either of the coils 172 and 174 will cause movement of the relay contacts 166 into engagement with either the contact 168 or 170. If desired, the relay contact 166 may be suitably damped and magnetically or spring centered to have a neutral position as shown to prevent constant action in one direction or the other of the control device. However, such constant action may be desirable in some craft and the centering mechanism may be eliminated to increase the sensitivity of the automatic control system. The contacts 168 and 170 selectively control energization of field windings 202 and 204 for the motor 154. Energy for these windings is fed from the battery 176 through the wire 178 to a common wire 206 through the motor armature to either of the coils 202 or 204; through a wire 208 to the contact 168 through the contact arm 166 and a common wire 188 back to the battery 176; and through wires 210 to contact 170, contact arm 166 and the common wire 188 back to the battery 176. When the field winding 202 is energized, the motor 154 will rotate in a first direction to turn a worm 212 and thus a gear 214 to change the pitch of the blades 30. When the coil 204 is energized the worm 212 will rotate in the opposite direction to change the pitch of the blades 30 in the opposite sense.

When more torque is required by the sustaining rotor blades 22, and they are turned clockwise, the gear box 26 will be biased in a direction to rotate the same counter-clockwise and compress the spring 38. This will cause the wiper 160 to move upwardly on the potentiometer 162. At this time, current from the battery 176 through the wires 178 and the wiper 160 will have less resistance through the wires 190, the switch 192, the wire 194, a trim adjustment 196, the relay coil 174, the wire 200, the upper part of potentiometer 184, the motor wiper 186 and the wire 188 back to the battery than it will have through that circuit which energizes the coil 172 and which was traced above. Accordingly, the contact arm of the relay 164 will be drawn into engagement with the contact 170 which will energize the field winding 202 of the motor 154 to rotate the control mechanism 152 in a direction to change the pitch of the blades 30 of the tail rotor in a direction to counterbalance such torque so that the body of the helicopter will not be rotated in a direction opposite to the direction of rotation of the main sustaining rotor blades 22. Movement of the motor 154 will cause the potentiometer wiper 186 to move downward in a direction to increase the resistance in the above named circuit to the relay coil 174 and to decrease the resistance in the circuit to the relay coil 172 until such time that the energization of each is substantially equal, at which time the relay contact 166 will move into the mid-position shown if a centering device is used therewith, or into engagement with the contact 168. It is to be understood that if desired, known anticipating circuits can be employed in connection with the bridge circuit described above to prevent overshooting or hunting of the control arrangement described above. Upon a decrease in torque requirements in the main rotor the potentiometer wiper 160 moves downwardly to energize the relay coil 172 so that the motor 154 is operated to change the pitch in the opposite sense than described immediately above to balance the requirements of the system to prevent rotation of the body of the helicopter in the direction of rotation of the main rotor blades 22.

It is possible in the electrical control system to use the automatic portion thereof as a power booster for the manual control system. In other words, the pedals 158 can move the cables 156 to change pitch of the blades 30 at all times, but by also employing a potentiometer 220 with a wiper 222 connected to at least one of the pedals 158, the control system described above can be operated in a manner to unbalance the bridge under the influence of manual control so that the motor 154 can aid the pilot in his manual operation to prevent fatigue or to reduce the manual force required to operate the controls of a large helicopter. To obtain such aided manual control, the switch 192 may be moved into engagement with a contact 224. At this time the current to the coil 174 will be variable upon the operation of the pedal 158, and the coil 172 of the bridge circuit will act as a reference. Hence, the pilot may move the pedal 158 to include more or less than a given resistance to raise or lower the potential of the coil 174 with respect to the now reference coil 172 to cause the motor 152 to operate in one direction or the other. The switch 192 may be conveniently operated by a knob 226 located within reach of the pilot. Also, the trim adjustment potentiometer 196 may be operated by a knob 228 similarly located.

It is also possible with the electrical system to obtain automatic speed compensation. It is well known that when hovering, a helicopter requires substantially the maximum of power of the tail rotor to maintain a given heading, plus enough reserve power for control purposes. However, when the helicopter is in forward flight, up to a certain point there is a weathercock action of the empennage section and it is conventional practice to design such sections to obtain the best efficiency in forward flight when flying in a somewhat crab-wise manner so that a maximum amount of torque is available to the sustaining and propelling rotors and only a minimum of torque is required in the torque compensating and controlling tail rotor. In order to obtain the maximum in efficiency in a helicopter of this type, I propose to introduce means responsive to speed of the helicopter, at least in the forward sense, for compensating the action of the automatic torque compensating built in structure described above, to provide for automatic reduction in torque requirement during forward speed. A pitot head 230 may lead to a suitable statically balanced bellows or diaphragm or the like 232 which may position a potentiometer 234 shown by way of example. It is to be understood that capacitance or inductance types of sensitive elements could also be used, and that they may require less operating force, or that suitably boosted electronic circuits could be incorporated in any known manner. As shown in this figure, movement of the bellows 232 in response to velocity changes at the pitot head 230 will cause movement of the potentiometer wiper 234 to change the resistance of a potentiometer 236. The switch 192 may be rotated into engagement with a contact 238 so that the change in potential or resistance by reason of motion of the wiper 234 will cause a change in energization of the relay coil 174 against the energization of relay coil 172 which again will serve as a reference in a manner similar to that described above in connection with augmentation in control by the power boost action for the manual controls. It is to be understood that it would be possible to place the manual control and the speed compensator in series if desired, by means of a second switch, to obtain both the manual power boost function and the speed compensation function simultaneously.

Figure 1A:
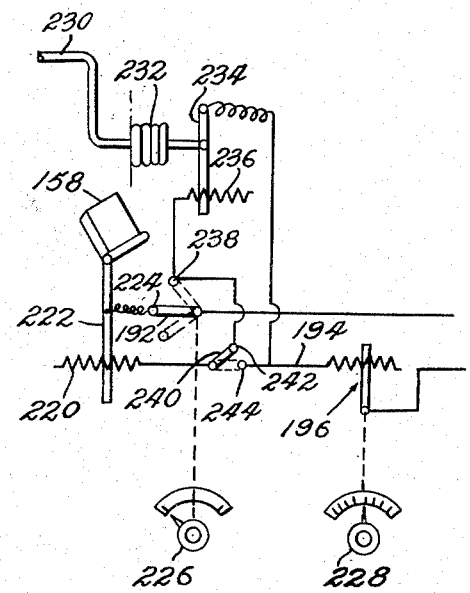
Fig. 1a is a detail view showing a modification of Fig. 3.

As shown in Fig. 1a a second switch 240 is provided having fixed contacts 242 and 244. When switch 240 is in engagement with its contact 244 the operation of the system is the same as described above in connection with Fig. 3, i. e., by moving switch 192 into engagement with contact 224 the manual power boost is obtained while by moving switch 192 into engagement with its contact 238 speed compensation is obtained.

When switch 240 is in engagement with its contact 242 and switch 192 is in engagement with its contact 224, as shown in Fig. 1a, then the two potentiometers 220 and 236 are in series and both the manual power boost function and the speed compensation function are obtained.

Several of the features of the electrical form shown and described above can be employed with other parts of the systems if desired. For this reason, I do not wish to be limited to the form shown and described, but by combination and subcombination thereof, as set forth in the following claims.

I claim:
1. In a rotary wing aircraft, in combination, power driven sustaining and auxiliary torque compensating rotors, means for changing the thrust of said auxiliary rotor for altering the compensating effect thereof, electrical torque sensitive means operative in response to torque of said sustaining rotor, and electrical translating means responsive to said sensitive means for causing operation of said thrust changing means, whereby the thrust of said auxiliary rotor changes as a function of change of torque of said sustaining rotor.

2. The structure recited in claim 1 in which said translating means includes an electrical bridge circuit unbalanced by said sensitive means and rebalanced by said thrust changing means.

3. The structure recited in claim 1 in which said translating means includes means responsive to movement of the aircraft in at least one direction for modifying the thrust changing function of said thrust changing means.

4. In a rotary wing aircraft, a main sustaining rotor, an auxiliary anti-torque rotor, an engine, fixed ratio drive means for driving said rotors by said engine at predetermined relative speeds, electro-responsive means for varying the thrust of said auxiliary rotor to compensate for variations in torque of said main rotor, and means responsive to the speed of said aircraft for energizing said electro-responsive means.

5. In a rotary wing aircraft, a main sustaining rotor, an auxiliary anti-torque rotor, an engine, fixed ratio drive means for driving said rotors by said engine at predetermined relative speeds, electro-responsive means for varying the thrust of said auxiliary rotor to compensate for variations in torque of said main rotor including a motor having forward and reverse windings, means controlled by the pilot for varying the thrust of said anti-torque rotor including rudder pedals, and means for providing power boost to the movements of said pedals including means responsive to the movements of said pedals for selectively energizing the windings of said motor.

6. In a rotary wing aircraft, a main sustaining rotor, an auxiliary anti-torque rotor, an engine, fixed ratio drive means for driving said rotors by said engine at predetermined relative speeds, a member movable in response to variations in torque of said main rotor, means controlled by the pilot including rudder pedals, electro responsive means for varying the thrust of said auxiliary rotor to compensate for variations in torque of said main rotor, and electrical translating means between said torque responsive member and said pedals on the one hand and said electro responsive means on the other including a normally balanced bridge circuit having windings the energization of which is controlled by movements of said torque responsive member and said rudder pedals each independently of the other for controlling said electro responsive means.

7. In a rotary wing aircraft, a main sustaining rotor, an auxiliary anti-torque rotor, an engine, fixed ratio drive means for driving said rotors by said engine at predetermined relative speeds, a member movable in response to variations in main rotor torque, pilot operated rudder pedals, means responsive to forward speed of said aircraft, electro responsive means for varying the thrust of said auxiliary rotor, and translating means including a bridge circuit having windings the energization of which is controlled by movements of either one independently or by said torque responsive member, said speed responsive member and said rudder pedals jointly for controlling said electro responsive means.

References Cited in the file of this patent

UNITED STATES PATENTS

| | | |
|---|---|---|
| 2,471,821 | Kutzler et al. | May 31, 1949 |
| 2,491,191 | Maillard et al. | Dec. 13, 1949 |